United States Patent
Weeks et al.

(10) Patent No.: US 12,551,423 B2
(45) Date of Patent: Feb. 17, 2026

(54) COMPOUNDS FOR USE IN KERATIN TREATMENT

(71) Applicant: CrossChem Limited, Brentwood, TN (US)

(72) Inventors: Jeffrey Dwight Weeks, Franklin, TN (US); Song Lin, Ithaca, NY (US); James Murray Perry, IV, Anitoch, TN (US); Christian William Allan, Encinitas, CA (US); Blake Leeam Weeks, Franklin, TN (US)

(73) Assignee: CrossChem Limited, Brentwood, TN (US)

( * ) Notice: Subject to any disclaimer, the term of this patent is extended or adjusted under 35 U.S.C. 154(b) by 220 days.

(21) Appl. No.: 18/418,444

(22) Filed: Jan. 22, 2024

(65) Prior Publication Data
US 2024/0252410 A1     Aug. 1, 2024

Related U.S. Application Data (60) Provisional application No. 63/481,042, filed on Jan. 23, 2023.

(51) Int. Cl.
| | |
|---|---|
| *A61K 8/44* | (2006.01) |
| *A61K 8/365* | (2006.01) |
| *A61Q 5/00* | (2006.01) |
| *A61Q 19/00* | (2006.01) |
| *C07C 229/24* | (2006.01) |

(52) U.S. Cl.
CPC ............ *A61K 8/44* (2013.01); *A61K 8/365* (2013.01); *A61Q 5/002* (2013.01); *A61Q 19/00* (2013.01); *C07C 229/24* (2013.01)

(58) Field of Classification Search
None
See application file for complete search history.

(56) References Cited

U.S. PATENT DOCUMENTS 5,877,212 A * 3/1999 Yu .................. A61K 47/549
                                                     514/460
2015/0034117 A1     2/2015 Pressly et al.

FOREIGN PATENT DOCUMENTS

WO    WO 2020/002128 A1    1/2020

OTHER PUBLICATIONS

Allan et al., Effects of Glycolic Acid on Human Hair Keratin. Coast Southwest. The Innovation Blog. Nov. 7, 2019. Accessed from <https://www.coastsouthwest.com/effects-of-glycolic-acid-on-human-hair-keratin/>. 6 pages.

* cited by examiner

*Primary Examiner* — Bong-Sook Baek
(74) *Attorney, Agent, or Firm* — Wolf, Greenfield & Sacks, P.C.

(57) ABSTRACT

Provided herein are compounds and formulations useful in treating keratin in hair and/or skin. In certain embodiments, the compounds and formulations provided herein can be used to strengthen hair, e.g., by improving the tensile strength of hair and/or improving hair elongation percentage.

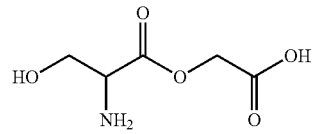

18 Claims, 5 Drawing Sheets

COMPOUNDS FOR USE IN KERATIN TREATMENT

RELATED APPLICATIONS

This application claims priority under 35 U.S.C. § 119(e) to U.S. provisional patent application, U.S. Ser. No. 63/481,042, filed Jan. 23, 2023, the entire contents of which is incorporated herein by reference.

BACKGROUND

Over 90% of the dry weight of hair comprises keratins, which have a high disulfide bond content derived from cysteine amino acids. These disulfide bonds impart stability to keratin structures. Keratin generally comprises two polypeptide chains that twist together to form a "coiled coil" structure. The ability of these coiled structures to unwind, even breaking internal hydrogen bonds (H-bonds), is what allows the α-helical structures to stretch. Normally, shape is restored when the tension is released and the H-bonds then reform. This in part gives hair its characteristic flexibility. However, when internal hair disulfide bonds are damaged or broken, the characteristic flexibility of hair strands is lost, and hair can become brittle, snarled, and/or frayed. Keratin is also a major component in skin. Damage to the disulfide bonds of keratin can cause skin to look unhealthy, dull, and/or flaky. Maintaining disulfide linkages in keratin helps keep the skin healthy, and prevents cracking and splitting.

A major goal of the cosmetics industry is the discovery and development of compounds and formulations for treating keratin in the hair and/or skin.

SUMMARY

Provided herein are compounds and formulations useful for treating keratin in hair and/or skin. In certain embodiments, the compounds and formulations provided herein can be used to strengthen hair, e.g., by improving the tensile strength of hair and/or improving hair elongation percentage.

For example, provided herein are compounds of Formula (I) and (II):

and cosmetically acceptable salts thereof, wherein G is a bond or a linker. In certain embodiments, G is a linker consisting of one or more glycolic acid and/or serine units.

In certain embodiments, the compound is of Formula (I-a) or (II-a):

or a cosmetically acceptable salt thereof, wherein n is 0 or an integer from 1-10, inclusive.

In certain embodiments, the compound is of Formula (I-b):

or a cosmetically acceptable salt thereof, wherein m is an integer from 1-10, inclusive.

In certain embodiments, the compound has a molecular weight of 1000 g/mol or less. In certain embodiments, the compound has a molecular weight of 500 g/mol or less. In certain embodiments, the length of the compound is 90 Å or less. In certain embodiments, the length of the compound is 45 Å or less.

In certain embodiments, the compound is of the formula:

or a cosmetically acceptable salt thereof.

In certain embodiments, the compound is Compound (1):

or a cosmetically acceptable salt thereof.

In certain embodiments, the compound is of the formula:

or a cosmetically acceptable salt thereof.

In certain embodiments, the compound is of the formula:

or a cosmetically acceptable salt thereof.

Also provided herein are formulations (e.g., cosmetically acceptable formulations) comprising a compound provided herein, or a cosmetically acceptable salt thereof, and one or more cosmetically acceptable carriers and/or excipients. In certain embodiments, a formulation described herein further comprises one or more organic acids. In certain embodiments, a described formulation further comprises one or more amino acids. In other embodiments, a described formulation further comprises one or more alpha hydroxy acids (AHAs) (e.g., glycolic acid). In some embodiments, a described formulation further comprises one or more beta hydroxy acids (BHAs). Examples of organic acids including amino acids, AHAs, and BHAs, are provided herein. In certain embodiments, the formulation is suitable for application to the hair and/or skin of a subject. In certain embodiments, the formulation is suitable for application to the hair.

Also provided herein are methods, including but not limited to:
(i) Methods comprising applying to the hair and/or skin of a subject a compound described herein, or a cosmetically acceptable salt thereof, or a formulation described herein. In certain embodiments, the compound or formulation is applied to the hair.
(ii) Methods of treating hair and/or skin of a subject comprising applying to the hair and/or skin of the subject a compound described herein, or a cosmetically acceptable salt thereof, or a formulation described herein. In certain embodiments, the method is a method of treating hair (e.g., by increasing tensile strength or elongation percentage of the hair).
(iii) Methods of treating keratin in the hair and/or skin of a subject comprising applying to the hair and/or skin of the subject a compound described herein, or a cosmetically acceptable salt thereof, or a formulation described herein. In certain embodiments, the method is a method of treating keratin in hair.

Also provided herein are kits (e.g., hair care kits) comprising one or more compounds, cosmetically acceptable salts thereof, or formulations thereof, described herein. The kit may comprise instructions for applying the compound or formulation to the hair. The kit may further comprise one or more additional compounds or formulations intended for application to the hair, e.g., in separate containers.

The details of certain embodiments of the disclosure are set forth in the Detailed Description of Certain Embodiments, as described below. Other features, objects, and advantages of the disclosure will be apparent from the Definitions, Examples, Figures, and Claims.

BRIEF DESCRIPTION OF THE DRAWINGS

The accompanying drawings, which are incorporated in and constitute a part of this specification, illustrate several embodiments of the disclosure and together with the description, provide non-limiting examples.

DETAILED DESCRIPTION OF CERTAIN EMBODIMENTS

Provided herein are compounds and formulations useful for treating keratin in hair and/or skin. In certain embodiments, the compounds and formulations provided herein can be used to strengthen hair, e.g., by improving the tensile strength of hair and/or improving hair elongation percentage.

Compounds

Provided herein are compounds (e.g., compounds of Formula (I) and (II)), and cosmetically acceptable salts thereof, comprising one or more serine and/or glycolic acid units. "Serine" refers to the amino acid serine and includes D-serine, L-serine, or combinations thereof.

In certain embodiments, the compound or cosmetically acceptable salt thereof comprises 1-10 glycolic acid units, inclusive. In certain embodiments, the compound or cosmetically acceptable salt thereof comprises 1-10 serine units, inclusive. In certain embodiments, the serine and/or glycolic acid units are linked through ester bonds.

Provided herein are compounds of Formula (I) and (II):

-continued (II)

and cosmetically acceptable salts thereof, wherein G is a bond or a linker.

In certain embodiments, G is a bond. In certain embodiments, G is a linker. In certain embodiments, G is a linker consisting of one or more glycolic acid and/or serine units.

In certain embodiments, the glycolic acid units are of the formula:

In certain embodiments, G comprises 0-10 glycolic acid units, inclusive. In certain embodiments, the serine units are of the formula:

In certain embodiments, G comprises 0-10 serine units, inclusive.

In certain embodiments, the compound is of Formula (I-a) or (II-a):

(I-a)

(II-a)

or a cosmetically acceptable salt thereof, wherein n is 0 or an integer from 1-10, inclusive.

In certain embodiments, n is 0. In certain embodiments, n is 1. In certain embodiments, n is 2. In certain embodiments, n is 3. In certain embodiments, n is 4. In certain embodiments, n is 5. In certain embodiments, n is 6. In certain embodiments, n is 7. In certain embodiments, n is 8. In certain embodiments, n is 9. In certain embodiments, n is 10.

In certain embodiments, the compound is of Formula (I-b):

(I-b)

or a cosmetically acceptable salt thereof, wherein m is an integer from 1-10, inclusive.

In certain embodiments, m is 1. In certain embodiments, m is 2. In certain embodiments, m is 3. In certain embodiments, m is 4. In certain embodiments, m is 5. In certain embodiments, m is 6. In certain embodiments, m is 7. In certain embodiments, m is 8. In certain embodiments, m is 9. In certain embodiments, m is 10.

In certain embodiments, the compound has a molecular weight of 1000 g/mol or less. In certain embodiments, the compound has a molecular weight of 900 g/mol or less, 800 g/mol or less, 700 g/mol or less, 600 g/mol or less, 500 g/mol or less, 400 g/mol or less, 300 g/mol or less, or 200 g/mol or less. In certain embodiments, the compound as a molecular weight of about 163 g/mol to about 1000 g/mol. In certain embodiments, the compound as a molecular weight of about 163 g/mol to about 500 g/mol.

In certain embodiments, the length of the compound is 90 Å or less. As used herein, the "length" of a compound refers to the total distance between the two ends of the longest linear atom chain of the compound. In certain embodiments, the length of the compound is 80 Å or less, 70 Å or less, 60 Å or less, 50 Å or less, 45 Å or less, 40 Å or less, 30 Å or less, 20 Å or less, 10 Å or less, or 5 Å or less. In certain embodiments, the length of the compound is from about 3 Å to about 90 Å. In certain embodiments, the length of the compound is from about 3 Å to about 45 Å.

In certain embodiments, the compound is of the formula:

or a cosmetically acceptable salt thereof.

In certain embodiments, the compound is Compound (1):

Compound (1)

or a cosmetically acceptable salt thereof.

In certain embodiments, the compound is:

or a cosmetically acceptable salt thereof.

In certain embodiments, the compound is of the formula:

or a cosmetically acceptable salt thereof.

In certain embodiments, the compound is of the formula:

or a cosmetically acceptable salt thereof.

In certain embodiments, the compound is of the formula:

or a cosmetically acceptable salt thereof.

As used herein, "compound," "a compound," or "the compound" refers to any compound described herein (including compounds of Formula (I) or (II) or any subgenus thereof, and any species described herein) or a cosmetically acceptable salt thereof.

The term "salt" refers to any and all salts, and encompasses cosmetically acceptable salts. Salts include ionic compounds that result from the neutralization reaction of an acid and a base. A salt is composed of one or more cations (positively charged ions) and one or more anions (negative ions) so that the salt is electrically neutral (without a net charge). Salts of the compounds of this disclosure include those derived from inorganic and organic acids and bases.

"Cosmetically acceptable salts" refers to those salts which are suitable for use in contact with the tissues (e.g., hair, skin, nails) of humans or other animals without undue toxicity, irritation, allergic response, and the like, and are commensurate with a reasonable benefit/risk ratio. Cosmetically acceptable salts include those derived from suitable inorganic and organic acids and bases. Examples of cosmetically acceptable, nontoxic acid addition salts are salts of an amino group formed with inorganic acids, such as hydrochloric acid, hydrobromic acid, phosphoric acid, sulfuric acid, and perchloric acid or with organic acids, such as acetic acid, oxalic acid, maleic acid, tartaric acid, citric acid, succinic acid, or malonic acid or by using other methods known in the art such as ion exchange. Other cosmetically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Cosmetically acceptable salts derived from appropriate bases include alkali metal, alkaline earth metal, ammonium, and $N^+$ ($C_{1-4}$ alkyl)$_4^-$ salts. Representative alkali or alkaline earth metal salts include sodium, lithium, potassium, calcium, magnesium, and the like. Further cosmetically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

Compounds that have the same molecular formula but differ in the nature or sequence of bonding of their atoms or the arrangement of their atoms in space are termed "isomers". Isomers that differ in the arrangement of their atoms in space are termed "stereoisomers". Stereoisomers that are not mirror images of one another are termed "diastereomers" and those that are non-superimposable mirror images of each other are termed "enantiomers". A mixture of compounds containing equal proportions of enantiomers is called a "racemic mixture."

Compounds described herein comprise one or more asymmetric centers, and thus can exist in various stereoisomeric forms, e.g., enantiomers and/or diastereomers. For example, the compounds described herein can be in the form of an individual enantiomer, diastereomer, or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses.

Compounds provided herein can comprise L-serine units, D-serine units, or a combination of both. For example, any occurrence of the formula:

in a compound can be, independently,

Cosmetic Formulations

Provided herein are formulations comprising a compound described herein (e.g., a compound of Formula (I) or (II)) or a cosmetically acceptable salt thereof, and one or more cosmetically acceptable carriers and/or excipients.

In certain embodiments, the formulations described herein further comprise one or more organic acids, wherein the one or more organic acids are independently selected from amino acids, alpha hydroxy acids (AHAs), and beta hydroxy acids (BHAs). In some embodiments, the formulation comprises an amino acid selected from serine, tyrosine, and aspartic acid. In some embodiments, the formulation comprises an alpha hydroxy acid (AHA) selected from glycolic acid, lactic acid, citric acid, tartaric acid, malic acid, mandelic acid, α-hydroxyoctanoic acid, α-hydroxydecanoic acid, and α-hydroxybutyric acid. In certain embodiments, the formulation comprises glycolic acid. In some embodiments, the formulation comprises a beta hydroxy acid (BHA) selected from salicylic acid or O-hydroxybutyric acid. In certain embodiments, the formulation comprises maleic acid.

In certain embodiments, the formulation is suitable for application to the hair and/or skin of a subject. In preferred embodiments, the formulation is suitable for application to the hair. The terms "formulation" and "composition" are used interchangeably.

Formulations comprising a compound described herein can be formulated and prepared according to commonly known principles in the art of cosmetics and personal care products.

Formulations suitable for application to the hair and/or skin of a subject may be in the form of a shampoo, conditioner, cream, lotion, paste, gel, spray, mousse, or other solution or suspension. Cosmetically acceptable carriers and/or excipients include but are not limited to solvents, surfactants, conditioners, emollients, humectants, penetrants, foaming agents, thickeners, emulsifiers, dispersants, diluents, lubricants, propellants, sequestering or chelating agents, preservatives, buffering agents, antioxidants, vitamins, lipids, proteins, amino acids, oils, waxes, extracts, colorants or dyes, opacifiers, and fragrances. Other cosmetically acceptable additives are possible.

As described herein, in certain embodiments, the formulation further comprises one or more organic acids. In certain embodiments, the one or more organic acids are independently selected from alpha hydroxy acids (AHAs), beta hydroxy acids (BHAs), and amino acids.

In certain embodiments, the formulation comprises one or more AHAs. Non-limiting examples of AHAs include glycolic acid, lactic acid, citric acid, tartaric acid, malic acid, mandelic acid, α-hydroxyoctanoic acid, α-hydroxydecanoic acid, and α-hydroxybutyric acid.

In certain embodiments, the formulation comprises glycolic acid.

In certain embodiments, the formulation comprises one or more BHAs. Non-limiting examples of BHAs include salicylic acid and β-hydroxybutyric acid.

In certain embodiments, the formulation comprises one or more amino acids. Non-limiting examples of amino acids include serine, tyrosine, and aspartic acid.

In certain embodiments, the formulation comprises maleic acid.

Also provided herein are kits (e.g., hair care kits) comprising one or more compounds, cosmetically acceptable salts thereof, or formulations thereof, described herein. The kit may comprise instructions for applying the compound or formulation to the hair. The kit may further comprise one or more additional cosmetically acceptable compounds or formulations intended for application to the hair, e.g., in separate container(s).

"Cosmetically acceptable" refers to materials which are suitable for use in contact with the tissues (e.g., hair, skin, nails) of human beings and animals without excessive toxicity, irritation, allergic response, or other problems or complications commensurate with a reasonable benefit/risk ratio. More specifically, cosmetically acceptable can refer to a material which is suitable for use in contact with the skin, scalp, and/or hair of a human. Cosmetically acceptable materials are known to those of ordinary skill in the art.

Methods of Treating Hair and Skin

Compounds and formulations described herein can be used to treat keratin and can therefore be used to treat hair and/or skin. "Keratin" refers to α-keratin, a key structural protein found in the hair, nails, and outer layer of the skin of vertebrates, including humans. Keratins (α-keratins) comprise α-helically coiled single protein strands, which are then further twisted into superhelical ropes that may be further coiled (a "coiled coil" structure). In addition to intra- and inter-molecular hydrogen bonds (H-bonds), a distinguishing feature of keratins is the presence of a relatively large number of disulfide bonds, resulting from a relatively large number of cysteine amino acids. These disulfide bridges confer additional strength and rigidity. When disulfide bonds in keratin break, the proteins can lose their strength and rigidity.

Without being bound by any particular theory, treating keratin with a compound or formulation described herein helps crosslink neighboring keratin protein strands by repairing broken disulfide and/or hydrogen bonds, thereby restoring and/or stabilizing the secondary structure of keratin. Treating keratin in the hair and/or skin leads to hair and/or skin with improved physical and/or cosmetic properties.

Provided herein are methods comprising applying to the hair and/or skin of a subject a compound described herein, or a cosmetically acceptable salt thereof, or a formulation thereof. In certain embodiments, the compound, cosmetically acceptable salt, or formulation is applied to the hair.

Provided herein are methods of treating hair and/or skin of a subject comprising applying to the hair and/or skin of the subject a compound described herein, or a cosmetically acceptable salt thereof, or a formulation thereof. In certain embodiments, the method is a method of treating hair of a subject.

In certain embodiments, the method is a method of strengthening hair of a subject. "Strengthening," as used herein, refers to increasing a material's resistance to breakage or physical damage. "Strengthening hair" therefore refers to increasing the hair's resistance to breakage or physical damage. "Tensile strength" refers to the resistance of a material to breaking under tension. Tensile strength of hair can be measured by a tensile strength test described herein.

In certain embodiments, the tensile strength of the hair is increased by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%, relative to control. In certain embodiments, the tensile strength of the hair is increased by about 10%, about 15%, about 20%, about 25%, about 30%, about 35%, about 40%, about 45%, or about 50%, relative to control. In certain embodiments, the tensile strength of the hair is increased by about 10% to about 50%, relative to control. The "control" may be a formulation or carrier not comprising the compound described herein or a cosmetically acceptable salt thereof.

In certain embodiments, the elongation percentage of the hair is increased. "Elongation percentage" refers to percent increase in the length of hair when the hair is stretched. In certain embodiments, hair elongation percentage is increased by at least 1%, at least 2%, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100%, relative to control. In certain embodiments, hair elongation percentage is increased by about 1%, about 2%, about 5%, about 10%, about 15%, or about 20%, relative to control. In certain embodiments, hair elongation percentage is increased by about 1% to about 10%, relative to control. The "control" may be a formulation or carrier not comprising the compound described herein or a cosmetically acceptable salt thereof.

Also provided herein are methods of treating keratin in the hair and/or skin of a subject comprising applying to the hair and/or skin of the subject a compound described herein or a cosmetically acceptable salt thereof, or a formulation thereof. In certain embodiments, the method is a method of treating keratin in the hair of a subject. In certain embodiments, the method comprises restoring and/or stabilizing a secondary structure of keratin.

As used herein, "applying," "application," and the like, when used in the context of a method described herein, refer to bringing a compound or formulation described herein in physical contact with a subject. For example, "applying" a compound or formulation described herein to the hair of a subject refers to bringing the compound or formulation in physical contact with the subject's hair in a topical fashion, e.g., for any duration of time.

As used herein, "subject" refers to a human or non-human mammal of any sex or age group. In certain embodiments the subject is a human.

As used herein, "treatment," "treat," "treating," and the like, refer to improving one or more cosmetic and/or physical properties of the thing being treated. For example, "treating hair" refers to improving one or more cosmetic and/or physical properties of the hair. Physical properties of the hair include, but are not limited to, tensile strength, elongation potential, flexibility, and elasticity. Cosmetic properties of the hair include, but are not limited to, shine, texture, and overall aesthetic appearance. Likewise, "treating skin" refers to improving one or more cosmetic or physical properties of the skin. Similarly, "treating keratin" as used herein refers to improving one or more physical properties of keratin, e.g., restoring and/or stabilizing the secondary structure of keratin.

EXAMPLES

In order that the present disclosure may be more fully understood, the following examples are set forth. The examples described in this application are offered to illustrate the compounds, formulations, and methods provided herein and are not to be construed in any way as limiting in their scope.

Example 1: Synthesis and Characterization of Compounds

Compound (1)

Compound (1), shown below, can be prepared by esterification reaction of serine with glycolic acid.

(1)

For example, Compound (1) was synthesized by N,N'-dicyclohexylcarbodiimide (DCC) coupling, followed by HCl gas-solid deprotection according to the following general procedure. This procedure produced a measurable yield of Compound (1) at a quantifiable purity.

General Procedure

A stirred solution of carboxylic acid (protected serine) in an anhydrous organic solvent is charged to a glass reactor. To this solution is added 4-dimethylaminopyridine (DMAP) and a stoichiometric amount of alcohol (protected glycolic acid). A stoichiometric amount of DCC is added to the reaction mixture at 0° C., which is then stirred for 5 min at 0° C. and 3 h or more at ambient temperature. After reaction completion, precipitated side product is removed via filtration. The organic filtrate solution is washed twice with 0.5 N HCl in a separatory funnel, then with saturated $NaHCO_3$ solution, and then dried over $Na_2SO_4$. $Na_2SO_4$ is removed via filtration, and remaining solvent is removed by evaporation to obtain solid intermediate product.

To a dual-chamber reactor the solid intermediate product is charged in one chamber (A) and a chloride salt is charged to the second chamber (B). Under a closed system, an organic acid is injected to chamber B. Both chambers are stirred for 1 h or more. After sufficient time, the system pressure is released, and chamber B is discharged. Additional chloride salt is charged to chamber B, acid injected, and the system allowed to react. This process is repeated a total of six (6) times. Remaining product in chamber A is Compound (1) (10 mmol), confirmed by NMR and HR-MS.

Characterization data for Compound (1): $^1$H NMR (400 MHz, DMSO-$d_6$) δ 8.62 (br, 3H), 5.55 (br, 1H), 4.71 (d, 2H), 4.19 (t, 1H), 3.84 (s, 2H); $^{13}$C NMR (600 MHz, DMSO-$d_6$) δ 168.4, 167.8, 61.8, 59.5, 54.2. HR-MS (ES$^+$): m/z 164, 100% (M)+; 165, 6% (M+H)$^+$; 327, 15% (M+M−H)$^+$.

Example 2: Hair Tensile Strength

General Method

Hair tensile strength can be measured according to the following general method. "Test Compound" can be any compound described herein.
1. Collect about 3 hair strands from tress;
2. Clamp both ends of a single hair strand and pull taut;
3. Line up ruler with hair strand and cut a 2.75 cm section;
4. Repeat steps 2-3 until 30 segments are produced;
5. Create a specific w/w % solution of deionized water and Test Compound (e.g., Compound (1)) in 50 ml beaker;
6. Saturate the hair for a specific amount of time in the solution, then remove and dry for 30 minutes;
7. Using a 4 decimal precision balance, weigh all hairs at once and calculate the average;
8. Insert hair into the digital force gauge;
9. Separate the two clamps until the hair has broken into two separate pieces; and
10. Note the maximum force required to break the hair as well as the distance the digital force gauge has moved.

Control experiments can also be conducted according to the procedure described above, for example by omitting Test Compound from the solution or replacing Test Compound with compound for comparison (e.g., glycolic acid).

Results

Figure 1:
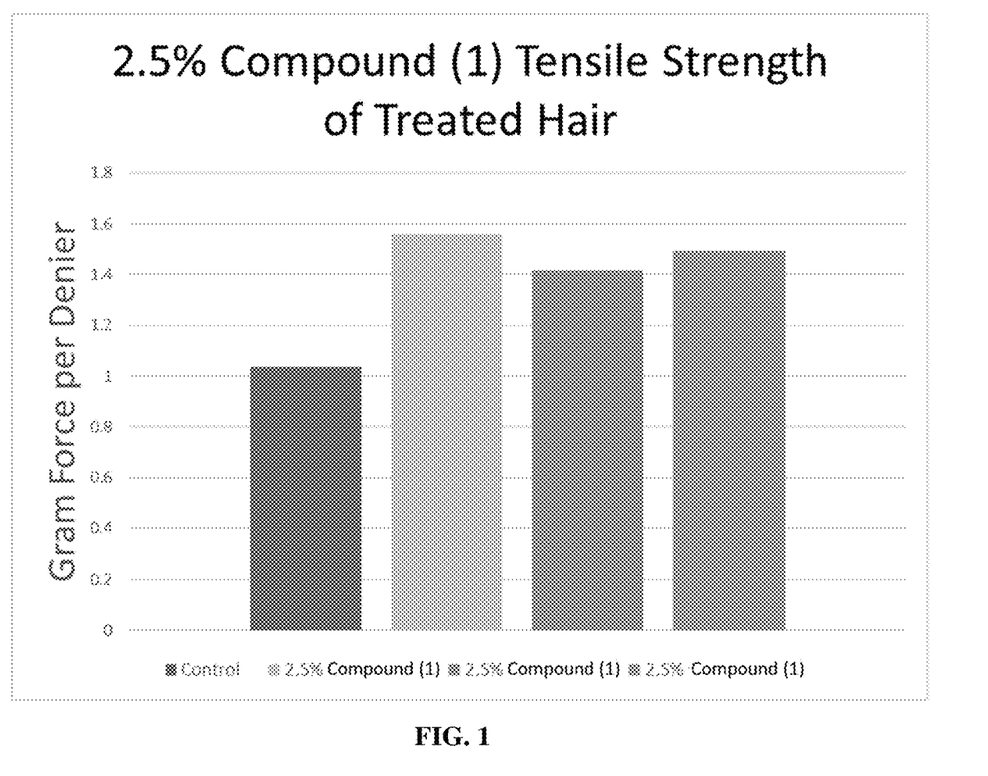
FIG. 1. Tensile strength of hair after treatment with Compound (1), relative to control. The control is hair treated 100% deionized (DI) water. The tensile strength test with Compound (1) was repeated in triplicate (each replicate represented by a bar). The results show that Compound (1) significantly increases tensile strength of hair.
Figure 2:
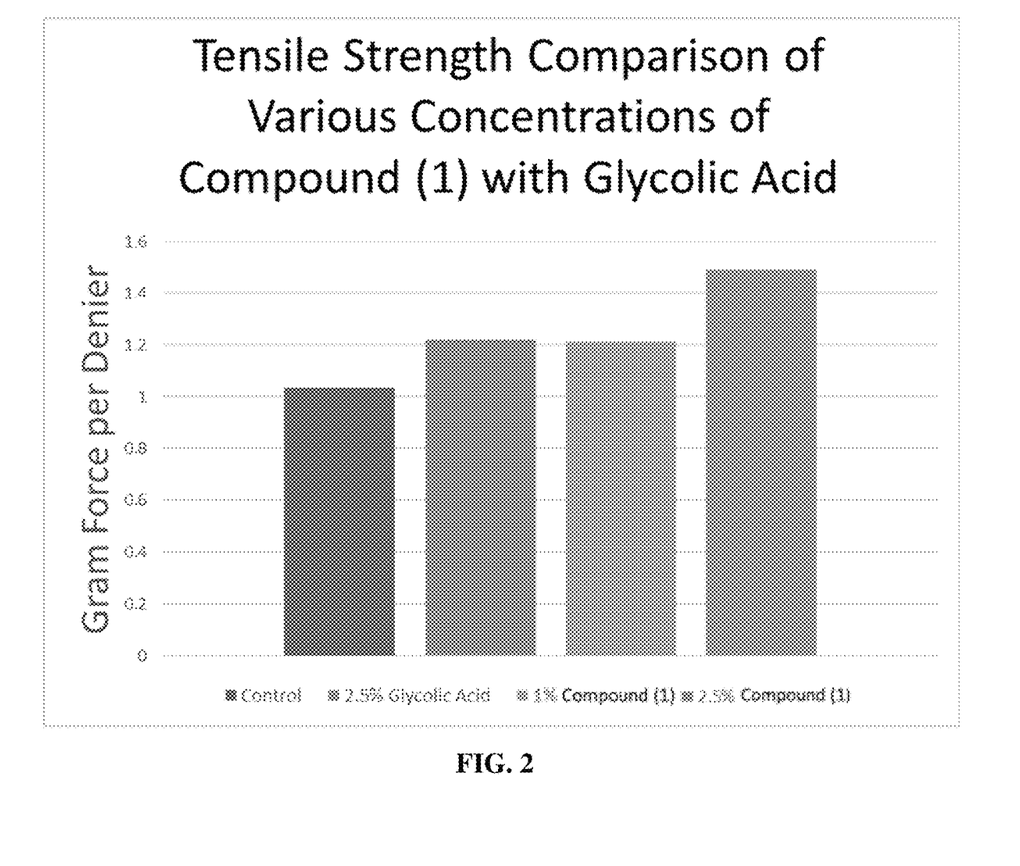
FIG. 2. Tensile strength of hair after treatment with Compound (1), as compared to glycolic acid. A 2.5 w/w % solution of Compound (1) significantly increases tensile strength of hair relative to a 2.5 w/w % solution of glycolic acid. The control is hair treated 100% deionized (DI) water.

A shown in FIG. 1, Compound (1) significantly increases tensile strength of hair, relative to control (control is hair treated 100% deionized (DI) water). As shown in FIG. 2, Compound (1) significantly increases tensile strength of hair as compared to glycolic acid. Table 1 below shows tensile strength (in gram force/denier (gf/denier)) after treatment with control (100% deionized (DI) water), 2.5 w/w % glycolic acid, 1 w/w % Compound (1), and 2.5 w/w % Compound (1). Significantly, a 2.5 w/w % Compound (1) solution increased tensile strength by 43.9%, relative to control.

TABLE 1

Strength of hair after treatment with Compound (1), compared to glycolic acid

|  | Control | 2.5% Glycolic Acid | 1% Compound (1) | 2.5% Compound (1) |
|---|---|---|---|---|
| Gf/Denier | 1.035 | 1.219 | 1.210 | 1.490 |
| % Increase | — | 17.8 | 16.9 | 43.9 |

Example 3: Hair Elongation

Figure 3:
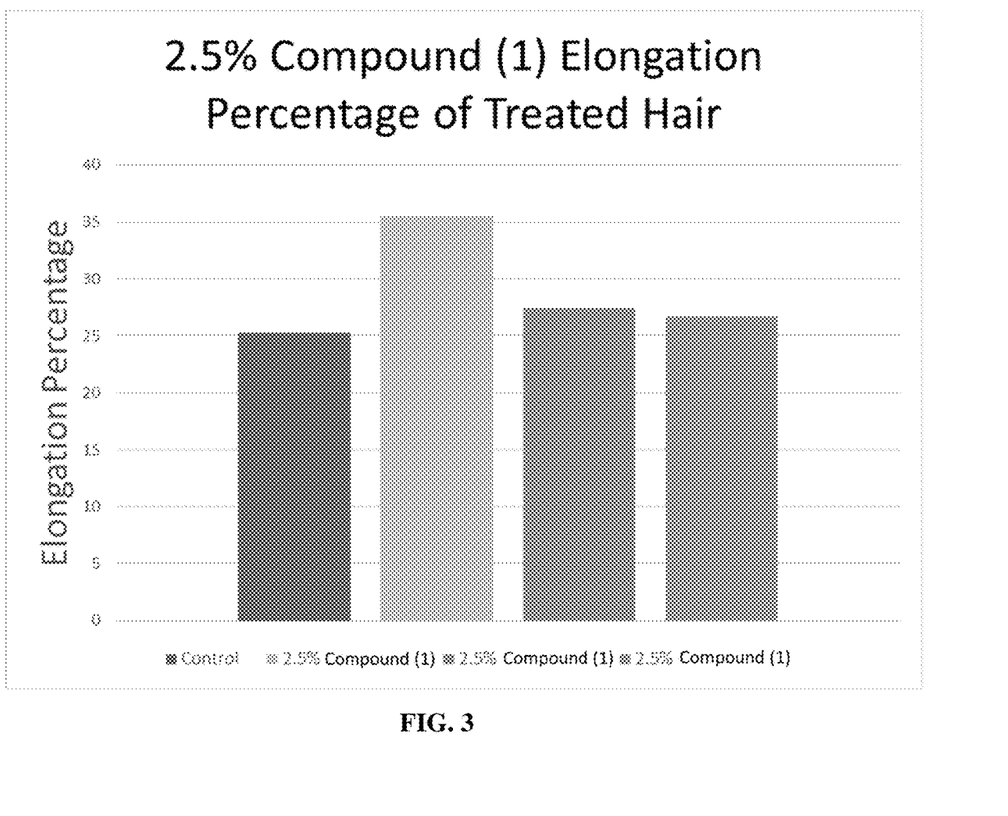
FIG. 3. Elongation percentage of hair after treatment with Compound (1), relative to control. The control is hair treated 100% deionized (DI) water. Elongation test with Compound (1) was repeated in triplicate (each replicate represented by a bar). The results show that Compound (1) increases elongation percentage of hair.
Figure 4:
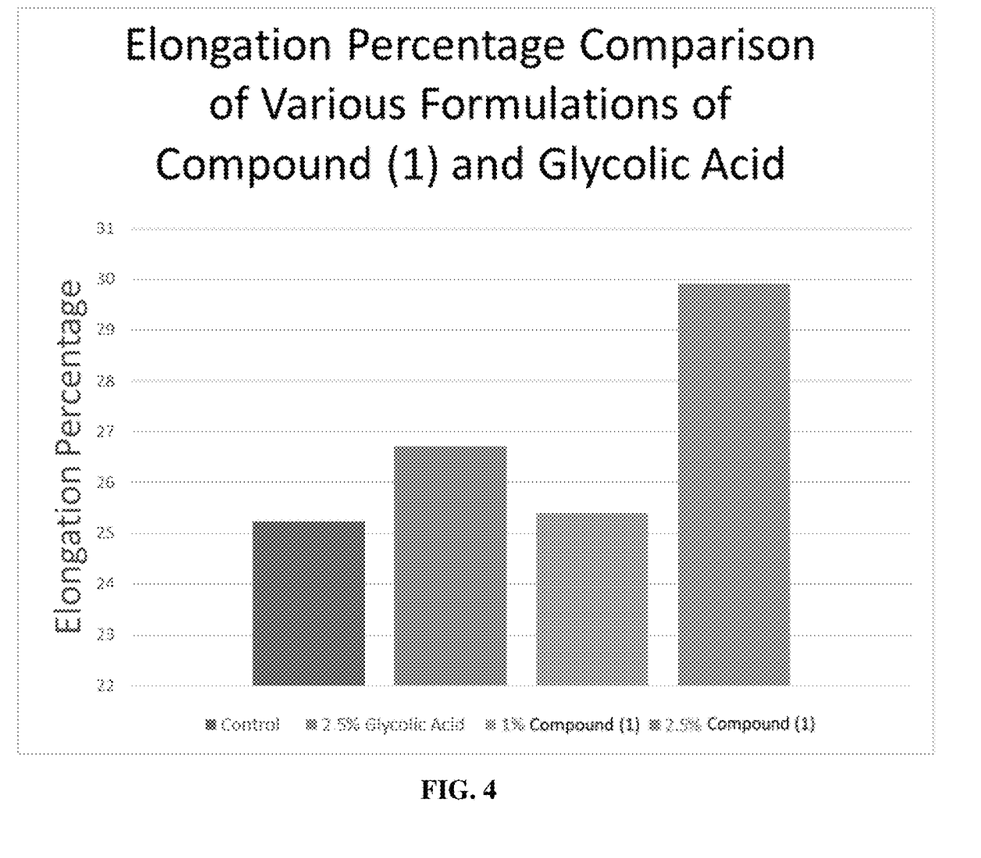
FIG. 4. Elongation percentage of hair after treatment with Compound (1), as compared to glycolic acid. A 2.5 w/w % solution of Compound (1) significantly increases elongation percentage of hair relative to a 2.5 w/w % solution of glycolic acid. The control is hair treated 100% deionized (DI) water.
Figure 5A:
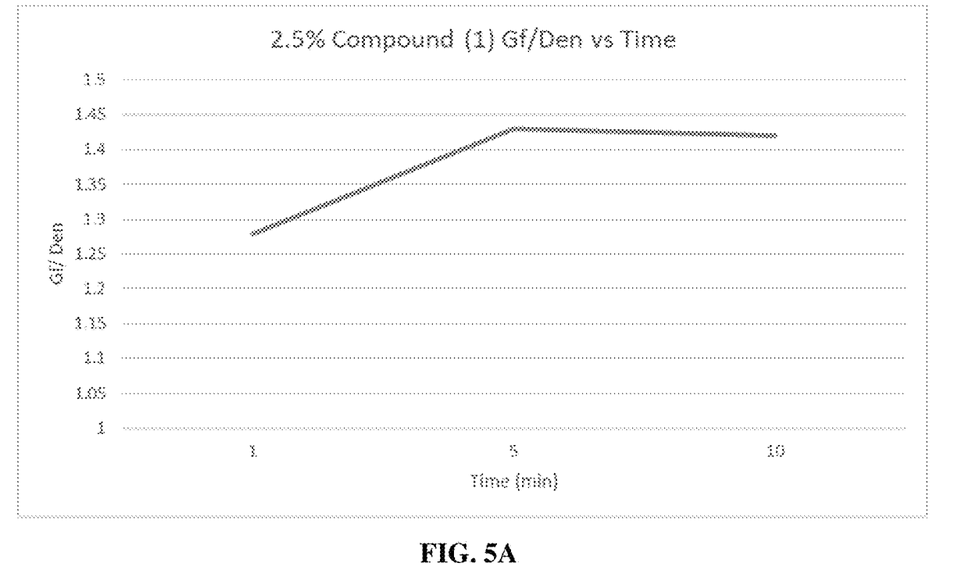
FIGS. 5A-5B. Effect of hair submersion time on tensile strength (FIG. 5A) and elongation percentage (FIG. 5B). Tests were conducted in 2.5 w/w % Compound (1) solutions.
Figure 5B:
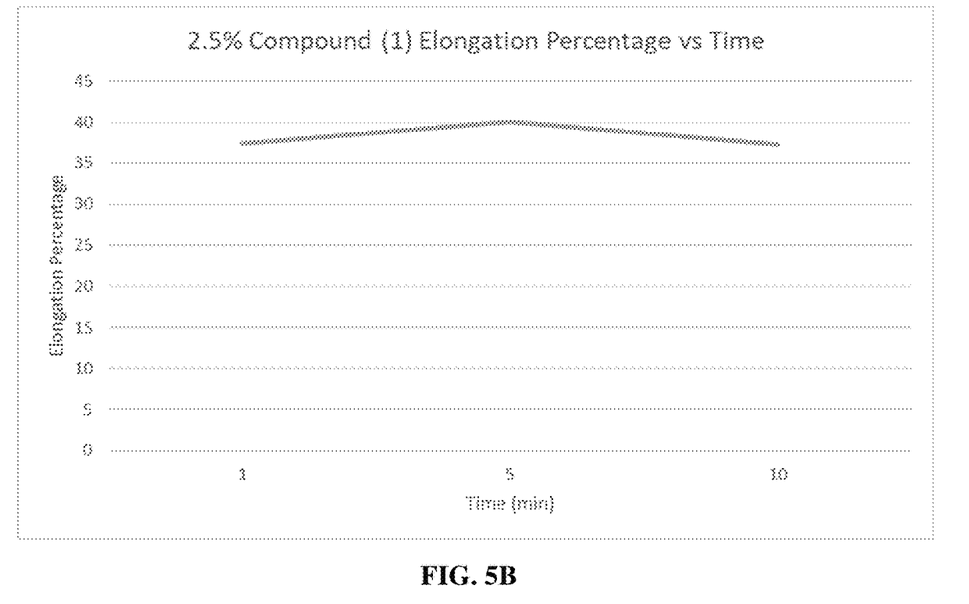

Compound (1) increases elongation percentage of hair. FIG. 3 shows the elongation percentage of hair after treatment with Compound (1), relative to control. FIG. 4 shows elongation percentage of hair after treatment with Compound (1), as compared to glycolic acid. Below, Table 2 shows the % increase in elongation percentage after treatment with control (100% deionized (DI) water), 2.5 w/w % glycolic acid, 1 w/w % Compound (1), and 2.5 w/w % Compound (1).

TABLE 2

Elongation of hair treated with Compound (1), compared to glycolic acid

|  | Control | 2.5% Glycolic Acid | 1% Compound (1) | 2.5% Compound (1) |
|---|---|---|---|---|
| Elongation % | 25.23 | 26.71 | 25.4 | 29.9 |
| % Increase | — | 5.87 | 0.67 | 18.51 |

Example 4: Formulation with Combination of Compound (1) and Glycolic Acid

A combination formulation (Formulation 1) comprising Compound (1) and glycolic acid as an aqueous mixture was tested. Formulation 1 comprises a 1:1 ratio (by weight) of Compound (1) to glycolic acid. To prepare Formulation 1, a mixture containing 50 w/w % Compound (1) and 50 w/w % glycolic acid (crystalline) was prepared (Mixture A). Mixture A was diluted with deionized (DI) water (aqua) until the solution was 5 w/wt % Mixture A.

Formulation 1 was independently analyzed to determine whether elongation of bleached hair at break stress increased compared to both control and glycolic acid solutions. The glycolic acid solution was a 5 w/w % glycolic acid solution in DI water. The control was DI water alone. The resulting data is displayed in Table 3 below.

TABLE 3

Elongation of hair treated with Formulation 1, compared to control (DI water) and glycolic acid

| Active Ingredient | Mean Elongation % | Difference from Control (%) |
|---|---|---|
| Control (DI Water) | 51.5 | 0 |
| Glycolic Acid | 55.3 | 7.38 |
| Formulation 1 | 56.3 | 9.32 |

Other combinations are possible. For example, the glycolic acid portion of Formulation 1 might be substituted or combined with one or more organic acids selected from the following: lactic, citric, malic, maleic, tartaric, mandelic, salicylic, and hydroxybutyric. Also for example, the glycolic acid portion of Formulation 1 can be substituted or combined with one or more of the following amino acids: serine, tyrosine, and aspartic acid.

Additional Embodiments

Additional embodiments are provided as indicated by the following numbered embodiments:

Embodiment 1. A compound of Formula (I) or (II):

or a cosmetically acceptable salt thereof, wherein G is a bond or a linker.

Embodiment 2. The compound of Embodiment 1, or a cosmetically acceptable salt thereof, wherein G is a linker consisting of one or more glycolic acid and/or serine units.

Embodiment 3. The compound of Embodiment 1 or 2, wherein the compound is of Formula (I-a) or (II-a):

or a cosmetically acceptable salt thereof, wherein n is 0 or an integer from 1-10, inclusive.

Embodiment 4. The compound of Embodiment 1 or 2, wherein the compound is of Formula (I-b):

or a cosmetically acceptable salt thereof, wherein m is an integer from 1-10, inclusive.

Embodiment 5. The compound of any one of Embodiments 1-4, or a cosmetically acceptable salt thereof, wherein the compound has a molecular weight of 1000 g/mol or less.

Embodiment 6. The compound of any one of Embodiments 1-5, or a cosmetically acceptable salt thereof, wherein the compound has a molecular weight of 500 g/mol or less.

Embodiment 7. The compound of any one of Embodiments 1-6, or a cosmetically acceptable salt thereof, wherein the length of the compound is 90 Å or less.

Embodiment 8. The compound of any one of Embodiments 1-7, or a cosmetically acceptable salt thereof, wherein the length of the compound is 45 Å or less.

Embodiment 9. The compound of Embodiment 1, wherein the compound is of the formula:

or a cosmetically acceptable salt thereof.

Embodiment 10. The compound of Embodiment 7, wherein the compound is:

or a cosmetically acceptable salt thereof.

Embodiment 11. The compound of Embodiment 7, wherein the compound is of the formula:

or a cosmetically acceptable salt thereof.

Embodiment 12. The compound of Embodiment 11, wherein the compound is of the formula:

or a cosmetically acceptable salt thereof.

Embodiment 13. A formulation comprising a compound of any one of Embodiments 1-12, or a cosmetically acceptable salt thereof, and one or more cosmetically acceptable carriers and/or excipients.

Embodiment 14. The formulation of Embodiment 13, wherein the formulation further comprises an organic acid.

Embodiment 15. The formulation of Embodiment 14, wherein the organic acid is an amino acid.

Embodiment 16. The formulation of Embodiment 15, wherein the amino acid is selected from serine, tyrosine, and aspartic acid.

Embodiment 17. The formulation of Embodiment 14, wherein the organic acid is an alpha hydroxy acid (AHA).

Embodiment 18. The formulation of Embodiment 17, wherein the AHA is selected from glycolic acid, lactic acid, citric acid, tartaric acid, malic acid, mandelic acid, α-hydroxyoctanoic acid, α-hydroxydecanoic acid, and α-hydroxybutyric acid.

Embodiment 19. The formulation of Embodiment 17 or 18, wherein the AHA is glycolic acid.

Embodiment 20. The formulation of Embodiment 14, wherein the organic acid is a beta hydroxy acid (BHA).

Embodiment 21. The formulation of Embodiment 20, wherein the BHA is selected from salicylic acid and β-hydroxybutyric acid.

Embodiment 22. The formulation of any one of Embodiments 13-21, wherein the formulation further comprises maleic acid.

Embodiment 23. The formulation of any one of Embodiments 13-22, wherein the formulation is suitable for application to the hair and/or skin of a subject.

Embodiment 24. The formulation of Embodiment 23, wherein the formulation is suitable for application to the hair.

Embodiment 25. A method comprising applying to the hair and/or skin of a subject a compound of any one of Embodiments 1-12, or a cosmetically acceptable salt thereof, or a formulation of any one of Embodiments 13-24.

Embodiment 26. The method of Embodiment 25, wherein the compound, cosmetically acceptable salt thereof, or formulation is applied to the hair.

Embodiment 27. A method of treating hair and/or skin of a subject comprising applying to the hair and/or skin of the subject a compound of any one of Embodiments 1-12, or a cosmetically acceptable salt thereof, or a formulation of any one of Embodiments 13-24.

Embodiment 28. The method of Embodiment 27, wherein the method is a method of treating hair of a subject.

Embodiment 29. The method of Embodiment 27 or 28, wherein the method is a method of strengthening hair of a subject.

Embodiment 30. The method of Embodiment 28 or 29, wherein tensile strength of the hair is increased by at least 10%, relative to control.

Embodiment 31. The method of any one of Embodiments 28-30, wherein elongation percentage of the hair is increased by at least 5%, relative to control.

Embodiment 32. A method of treating keratin in the hair and/or skin of a subject comprising applying to the hair and/or skin of the subject a compound of any one of Embodiments 1-12, or a cosmetically acceptable salt thereof, or a formulation of any one of Embodiments 13-24.

Embodiment 33. The method of Embodiment 32, wherein the method is a method of treating keratin in the hair of a subject.

Embodiment 34. The method of Embodiment 32 or 33, wherein the method comprises restoring and/or stabilizing a secondary structure of keratin.

EQUIVALENTS AND SCOPE

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The present disclosure includes embodiments in which exactly one member of the group is present in, employed in, or otherwise relevant to a given product or process. The present disclosure includes embodiments in which more than one, or all of the group members are present in, employed in, or otherwise relevant to a given product or process.

Furthermore, the present disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group.

It should it be understood that, in general, where the present disclosure, or aspects of the present disclosure, is/are referred to as comprising particular elements and/or features, certain embodiments of the present disclosure or aspects of the present disclosure consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps.

Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the present disclosure, to the tenth of the unit of the lower limit of the range, unless the context clearly dictates otherwise.

This application may refer to issued patents, published patent applications, journal articles, and other publications, all of which are incorporated herein by reference. If there is a conflict between any of the incorporated references and the instant specification, the specification shall control. In addition, any particular embodiment of the present disclosure that falls within the prior art may be explicitly excluded from any one or more of the claims.

Because such embodiments are deemed to be known to one of ordinary skill in the art, they may be excluded even if the exclusion is not set forth explicitly herein. Any particular embodiment of the present disclosure can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present disclosure, as defined in the following claims.

What is claimed is:

1. A compound of Formula (I) or (II):

or a cosmetically acceptable salt thereof, wherein G is a bond or a linker.

2. The compound of claim 1, or a cosmetically acceptable salt thereof, wherein G is a linker consisting of one or more glycolic acid and/or serine units.

3. The compound of claim 1, wherein the compound is of Formula (I-a) or (II-a):

or a cosmetically acceptable salt thereof, wherein n is 0 or an integer from 1-10, inclusive.

4. The compound of claim 1, wherein the compound is of Formula (I-b):

(I-b)

or a cosmetically acceptable salt thereof, wherein m is an integer from 1-10, inclusive.

5. The compound of claim 1, wherein the compound is of the formula:

or a cosmetically acceptable salt thereof.

6. The compound of claim 5, wherein the compound is:

or a cosmetically acceptable salt thereof.

7. The compound of claim 1, wherein the compound is of the formula:

or a cosmetically acceptable salt thereof.

8. The compound of claim 7, wherein the compound is of the formula:

or a cosmetically acceptable salt thereof.

9. A formulation comprising a compound of claim 1, or a cosmetically acceptable salt thereof, and one or more cosmetically acceptable carriers and/or excipients.

10. The formulation of claim 9, wherein the formulation further comprises an organic acid.

11. The formulation of claim 10, wherein the organic acid is an amino acid, an alpha hydroxy acid (AHA), a beta hydroxy acid (BHA), or maleic acid.

12. The formulation of claim 11, wherein the organic acid is an AHA selected from glycolic acid, lactic acid, citric acid, tartaric acid, malic acid, mandelic acid, α-hydroxyoctanoic acid, α-hydroxydecanoic acid, and α-hydroxybutyric acid.

13. The formulation of claim 12, wherein the AHA is glycolic acid.

14. A method of treating hair and/or skin of a subject comprising applying to the hair and/or skin of the subject a compound of claim 1, or a cosmetically acceptable salt thereof, or a formulation thereof.

15. The method of claim 14, wherein the method is a method of treating hair of a subject.

16. The method of claim 14, wherein the method is a method of strengthening hair of a subject.

17. A method of treating keratin in the hair and/or skin of a subject comprising applying to the hair and/or skin of the subject a compound of claim 1, or a cosmetically acceptable salt thereof, or a formulation thereof.

18. The method of claim 17, wherein the method is a method of treating keratin in the hair of a subject.

* * * * *